Nov. 30, 1954  D. E. HEERDT  2,695,947
DEEP FAT FRYING ATTACHMENT FOR ELECTRIC RANGES
Filed Oct. 1, 1952  2 Sheets-Sheet 1
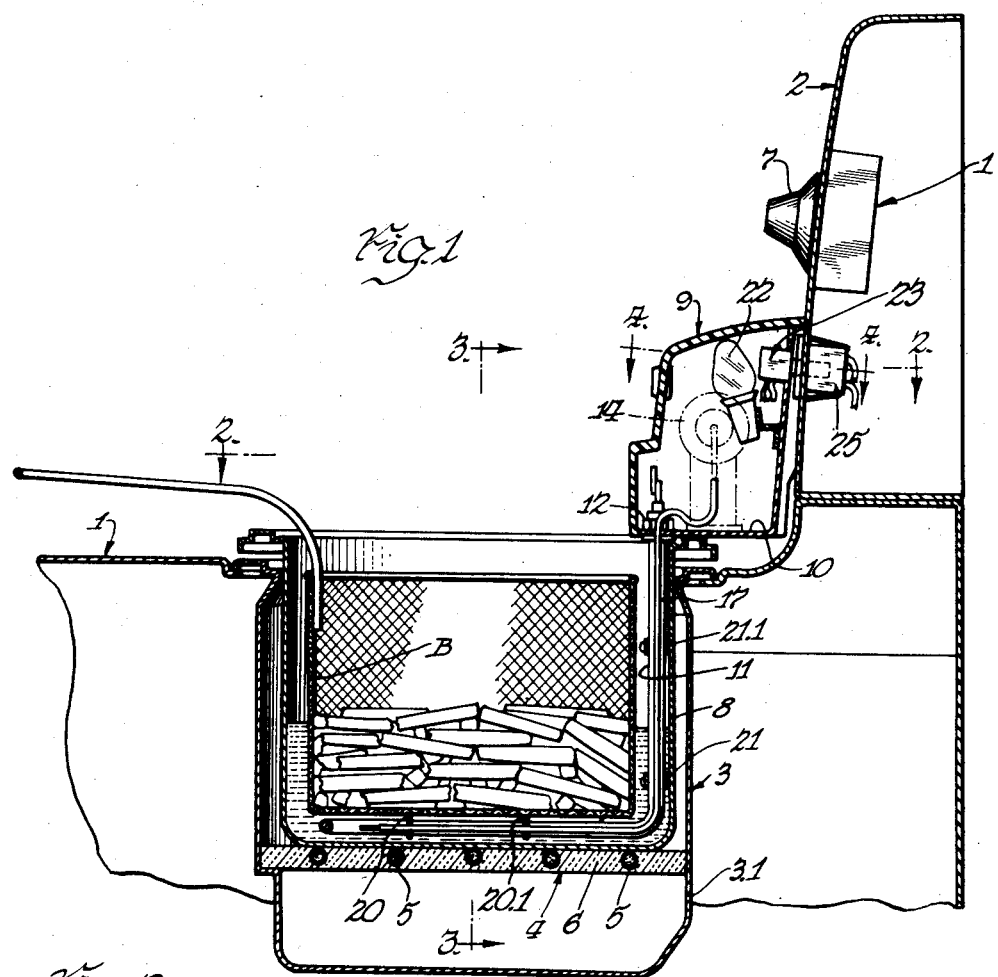
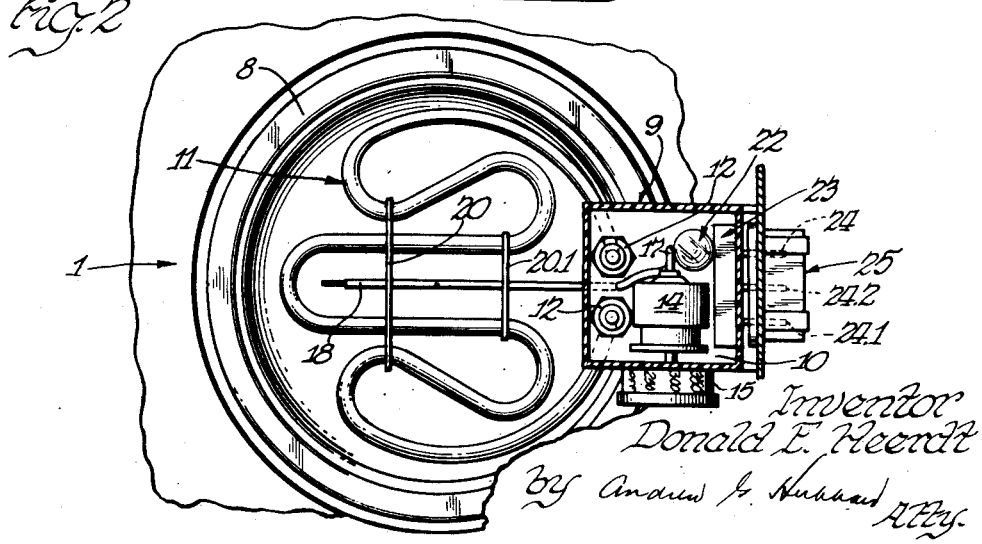

Nov. 30, 1954  D. E. HEERDT  2,695,947
DEEP FAT FRYING ATTACHMENT FOR ELECTRIC RANGES
Filed Oct. 1, 1952  2 Sheets-Sheet 2

Inventor
Donald E. Heerdt
By Andrew G. Hubbard
Atty.

United States Patent Office 2,695,947
Patented Nov. 30, 1954

2,695,947

DEEP FAT FRYING ATTACHMENT FOR ELECTRIC RANGES

Donald Edwin Heerdt, Cicero, Ill., assignor to General Electric Company, a corporation of New York Application October 1, 1952, Serial No. 312,554

5 Claims. (Cl. 219—35)

This invention relates to electric cooking devices, and in particular to a cooking attachment arranged for optional service in an electric circuit normally serving one of the heating units of an electric range.

It is a principal object of this invention to provide an individually thermostatically controlled heating element arranged to convert a cooking unit of an electric range into a device particularly well suited for deep-fat cookery or similar uses.

It is another object of the invention to provide a thermostatically controlled cooking attachment which derives its electrical energy from an electric circuit serving one of the permanent heating units of an electric range or the like, and when in use automatically disconnects said regular heating unit from the electrical circuit, thereby preventing conjoint use of the cooking attachment and heating unit.

It is a further object of the invention to provide a cooking device arranged for instant conversion of the usual deep well cooker of the electric range into a deep fat fryer.

It is another object of the invention to provide an individually thermostatically controlled deep fat fryer which is easy to apply to the deep well cooker circuit of an electric range, and will give trouble-free operation even when used by persons unskilled in mechanical or electrical devices.

Many electric ranges are now equipped with deep well cookers, usually comprising a cooker pail removably placed within a well in the range top and resting upon or in close proximity to a switch-controlled heating element in the base of the well. The deep well cooker with its removable cooker pail may be used for deep fat frying. For example, the fat or cooking oil may be heated by an immersion type heating element thermostatically controlled by apparatus sensitive to the temperature of the fat, and the foodstuffs to be cooked may be placed in any suitable basket or the like and lowered into the fat when the temperature thereof is at the desired cooking level. Using an immersion heater rather than the regular external heating element provides closer control of temperature because the heat is applied directly to the fat; but there is the always-present danger that the ignorant or careless user will energize the regular deep well cooker heating element in addition to the immersion heater. The thermostatic control of the immersion heater would then be rendered ineffective, because it has no control over the regular range unit; and although when the temperature of the cooking fat reaches the thermostat setting point, the immersion heater circuit would open, heat would continue to enter the fat from the range unit so long as its circuit remained closed. This may produce undesirably, or even dangerously, high temperatures of the cooking fat.

I have provided an immersion unit of the plug-in type which may safely be installed in the regular deep well heating element circuit. A particular feature of my invention is that the connection terminal of the immersion heater is provided with means which opens the deep well heating element circuit whenever the immersion unit is plugged into the outlet receptacle provided therefor, establishing a new circuit relationship in which the immersion element is in a position to receive energy upon operation of its control switch, but the range element may not be energized regardless of the operation of its switch. The thermostat therefore has full control of the cooking oil temperature.

Other features and advantages of the invention will be apparent from the following detailed description of a presently preferred embodiment thereof, read in connection with the accompanying drawing in which:

Fig. 1 is a side sectional elevation of the deep well cooker portion of an electric range showing in operative position the immersion heating element embodying the present invention;

Fig. 2 is a plan section taken on lines 2—2 of Fig. 1;

Figure 3:
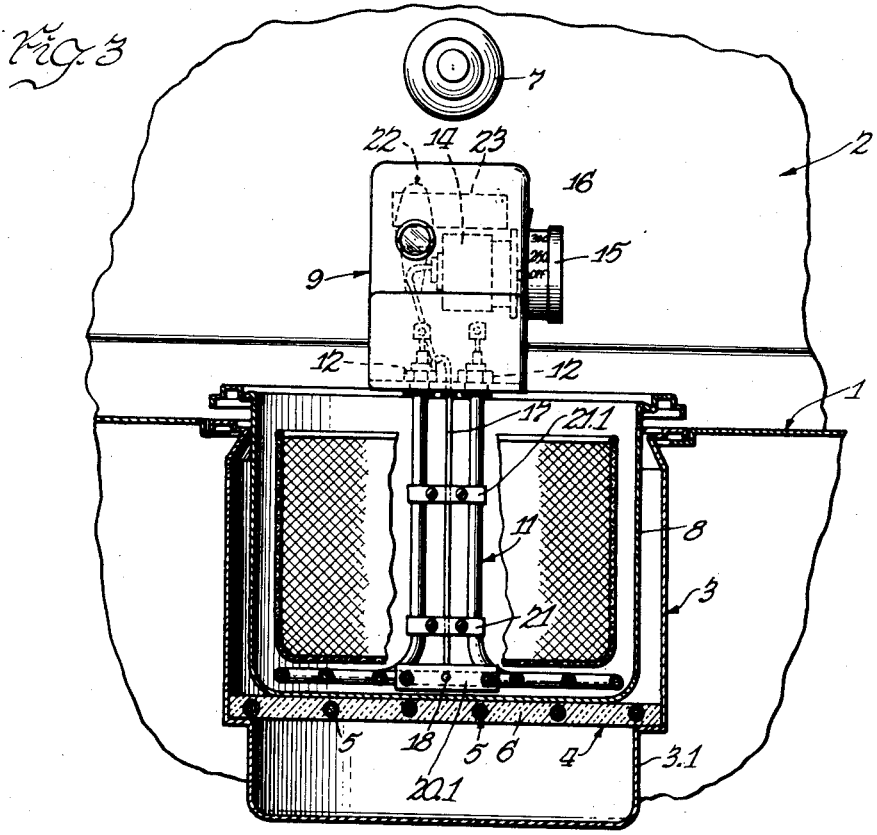
Fig. 3 is a front sectional elevation taken on lines 3—3 of Fig. 1.

In Fig. 1, 1 represents a portion of the cooking top of an electric range, 2 is the backsplasher portion thereof, and 3 is a deep well cooking element having suitably supported within the shell 3.1, an electric heating element 4, here represented as comprising open resistance coils 5 carried by a ceramic or other insulating block 6. The deep well cooking element per se forms no part of the present invention, and may if desired be of raisable heating element type disclosed in the F. E. Kirk U. S. Patent 2,591,051, granted August 15, 1950, for "Electric Heating Appliance." The resistance coils 5 may, in fact, comprise two independent coils electrically connected to a three-wire 115–230 v. A. C. Edison source through a switch 7 mounted in backsplasher 2. The switch may be of the rotary type shown in Illian U. S. Patent 2,483,831, granted October 9, 1949, for "Electric Switch" or of the pushbutton type shown in the J. L. Andrews Patent 2,431,904, granted December 2, 1947 for "Pushbutton Switch." The Illian and Andrews patents each show the electrical circuits by means of which a two-coil heating element may be connected to a three-wire power source to provide five different wattages. The maximum output of a deep well cooker heating element may be 1250 watts, and the other wattages available through the use of either of the named electric switches are 560, 310, 140, and 75 watts. The heating elements 5 may thus be arranged to produce such a variety of wattage outputs. As appears in the said Andrews and Illian patents, the switches are operable to place both heating coils in parallel across 230 v. for high heat; one coil, only, across 230 v. for second heat; both coils in parallel across 115 v. for third heat; one coil, only, across 115 v. for low; and both coils in series across 115 v. for warm. In all of the five circuits which accomplish these heating effects, a particular one of the line conductors is utilized; the other line conductor and the "neutral" conductor are in open or closed status according to the circuit requirements. Finally, the deep well cooking unit removably receives the cooking vessel or pail 8.

The immersion heating element embodying the present invention includes a control and connection head 9, from a wall portion 10 of which extends the substantially vertical terminal portions of tubular sheathed heating element 11, the major portion of which is convoluted to distribute a substantial length about the bottom of vessel 8, as indicated in Fig. 2. The element 11 may be of the type shown in the C. C. Abbott Patent No. 1,367,341, granted February 1, 1921, i. e., an electrical resistance element is embedded in a compacted mass of electrically insulating and thermally conducting material such as magnesium oxide, and the whole enclosed in a rigid, liquid-impervious metallic sheath. The terminal ends of the heating element may be secured to the wall 10, by suitable threaded connections 12. Also mounted within said control head 9, is a thermostat 14 having a conventional rotatable temperature adjustment provided with a setting knob 15 bearing suitable temperature indicia referable to an index mark or device 16 provided on an adjacent wall of the control head. The thermostat preferably incorporates an "on-off" switch arrangement, and may provide control point selection ranging from 200 to 500 degrees F. The conventional thermostat capillary tube 17, terminates in a temperature sensitive bulb portion 18 supported symmetrically with respect to the heating element 11 as shown. Suitable spacer bars 20, 20.1 serve to maintain the shape and arrangement of the heating element convolutions and the thermostat bulb 18, and other spacers 21, 21.1 serve a similar purpose with respect to the vertical terminal portions of the heating element and capillary tube. A satisfactory thermostat for the immersion heater is disclosed in the application of Nicholas Miller, Ser. No. 218,605, filed March 31, 1951, for "Temperature Control Device" and assigned to my present assignee. A pilot light 22 may be placed in the thermostat circuit to indicate when the thermostat is "calling for heat," as is conventional.

A terminal plug 23 is insulatedly mounted on the rear wall of the control head casing. Said plug has three blades, of which 24 and 24.1 are suitably connected to terminals of the thermostat, and 24.2 has a ground connection to the metallic sheath of the heating element. This ground connection may conveniently be accomplished by an electrical connection to one of the threaded conductors by which the heating element is secured to the casing wall.

A receptacle block 25 of insulation material is suitably supported on the backsplasher 2, with the apertures thereof arranged parallel to the cooking top and in alignment with the deep well cooker. Within the block are three contact members: 26 and 26.1 respectively, arranged for connection to the plus and minus leads of the three-wire circuit, and contact 26.2 forming a ground connection, as by being electrically connected to the metallic frame of the range. A fourth contact element 26.3 is operatively associated with contact 26, as presently explained.

Figure 4:
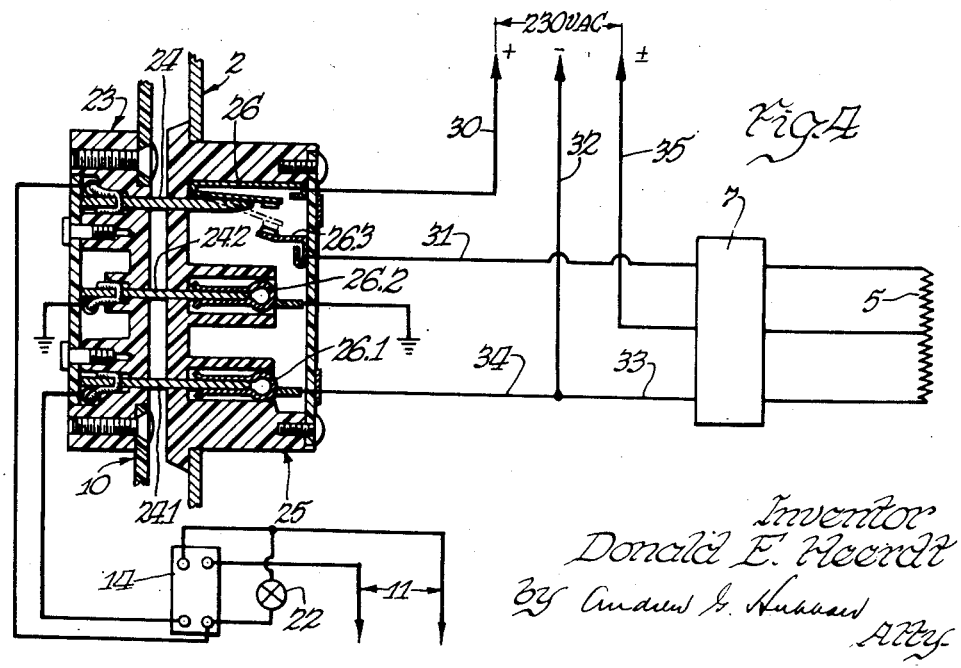
Fig. 4 is a plan section of the plug portion of the heating element and the terminal block showing the electrical circuit and the relationship of the terminal block to the deep well heating unit circuit.

When the immersion heater is not in use and is therefore withdrawn from the receptacle 25 the electrical circuit is completed to the deep well heater switch 7 as follows: "plus" conductor 30, terminal 26, which as indicated in dotted line in Fig. 4 is normally spring biased to close with terminal 26.3, and conductor 31 to one pole of switch 7. The "minus" line conductor 32 connects to switch 7 by conductor 33, and by conductor 34 to terminal 26.1. "Neutral" conductor 35 connects directly to switch 7.

When the frying unit is not in use, therefore, the three leads of the power source are available at switch 7 to provide the several wattages noted above. Conductor 31 is selected as the key conductor in the electrical system which must be conducting electricity in order to complete any of the circuits to the heating element 5.

Plugging in the unit connects the terminals of the heating element 11 directly across the 230 v. conductors 30 and 32, as is apparent from Fig. 4. Importantly, however, the blade 24 of plug 23 engages the spring contact portion of terminal block conductor 26 and biases it away from the cooperating contact 26.3. This interrupts the circuit between conductors 30 and 31, and because the various circuits which may be established by switch 7 require connection to the line conductor 30, it is obvious that a circuit may not be completed to heating element 5 regardless of the operative status of switch 7.

Plug blade 24 should be of sufficiently rigid stock to permit the springable portion of terminal 26 to be stiff enough to make firm, non-chattering connection with the associated terminal 26.3. It may be preferable to have blade 24.1 somewhat shorter than blade 24, to the end that before blade 24.1 closes with terminal 26.1, blade 24 will have deflected terminal 26 to open-circuit position. Such an arangement will protect the line against overloading in a circumstance where switch 7 had been operated to closed-circuit position and the control switch-thermostat 14 had been accidentally or otherwise operated to closed-circuit position prior to the insertion of the plug 23 into receptacle 25.

For example, the cooker pair 8 may have a quantity of a solid frying material such as "Crisco." Prior to plugging in the deep fat frying unit, the cook may choose to melt the material by operating switch 7 to "second" or even "high" position. Regardless of whether or not switch 7 is operated to "off" position, and regardless of whether the switch-thermostat 14 is in "off" position, plugging in the unit will cut the heating element 5 out of the circuit before the heater 11 draws current.

The use of the deep fat frying unit is easy and convenient. The control head 10 is of such size and shape as to be easily grasped in one hand, and the use of aluminum or other light materials for the casing portion of the control head helps keep the weight of the unit satisfactorily low. The location of terminal block 25 preferably establishes the heating element just out of contact with the bottom of cooker pair 8 so that there is a minimum of heat flow directly to the wall of the pail. The control knob 15 is then rotated from its "off" position to the desired cooking temperature position, thus connecting the heater to power. The bulb 22 will light, indicating that the cooking fat is not yet at control temperature. When the light extinguishes as the result of thermostat operation at the attainment of control temperature, the cook may place into the cooker pail a basket B containing the foodstuffs to be cooked. The basket will rest upon the spacer bars 20 and 20.1. At the end of the cooking operation, as determined by the passage of a specific time interval or by the color of the articles being cooked, the switch-thermostat may be operated to "off," basket B removed, and the excess cooking fat permitted to drain back into the pail 8.

While there have been described what are at present considered to be the preferred embodiments of the invention, it will be understood that various modifications may be made therein, and it is intended to cover in the appended claims all such modifications as fall within the true spirit and scope of the invention.

I claim:

1. In an electric range, including a cooking top having an upstanding rear wall portion and a cooking well adjacent said wall portion to receive a cooking pot, an electric heating element within said well and an electric circuit for supplying said heating element, the combination of an electric outlet receptacle mounted on said upstanding wall portion, said receptacle having contact members electrically in circuit with said heating element circuit and at least one of said contact members comprising a normally closed switching element in said heating element circuit, and an electric heater for immersion in said cooking pot, said heater having a control head, a rigid heating element secured to and extending from said control head, and an electric plug attachment fixed to said head and having contact blades extending therefrom for connection to the contact members of said receptacle to connect said electric heating element to said electric circuit, one of the blades of said attachment plug engaging with said one contact member to make electrical connection therewith while operating the same to open circuit status as respects said heating element circuit.

2. The combination according to claim 1, in which said immersion heater includes a thermostat disposed within said control head and having temperature-sensitive means responsive to the temperature of the contents of said cooking pot, said thermostat having an "off" setting in addition to its temperature control point settings, whereby said thermostat may function as a primary control switch for said immersion heater.

3. In an electric range or the like having an electrically heated element for a permanent cooking unit and an electric circuit for energizing said element, the combination of an electric connection receptacle having contact members connected to conductors of said circuit to provide a power take-off therefrom, one of said contact members constituting a portion of said cooking element circuit, an energy-consuming electrical appliance, means including a plug connection having terminal blades engageable with said receptacle contact members for connecting said appliance to said circuit for energization thereby, and means within said receptacle comprising a portion of said one contact member operating upon engagement of said contact member by a blade of said plug connection to open the circuit to said cooking unit heating element to preclude conjoint energization of said cooking unit element and said appliance.

4. In an electric range or the like having an electrically heated element for a cooking unit and an electric circuit for energizing said element, the combination of an electric connection receptacle having contact members connected to conductors of said circuit to provide a power take-off therefrom, one of said members having separable elements in series in said cooking element circuit, an energy-consuming electric appliance, means including a plug connection having terminal blades insertable into said receptacle for conductive engagement with said receptacle contact members for connecting said appliance to said circuit for energization thereby, and means whereby one of said elements of said one contact member will separate from another element thereof upon engagement by a blade of said plug connection to open the circuit to said cooking unit heating element while completing a circuit to said appliance, said cooking unit circuit remaining open so long as said plug connection terminal blades are in engagement with said receptacle contact members.

5. In an electric range or the like having an electrically heated element for a cooking unit and an electric circuit for energizing said element, the combination of an electric connection receptacle having a plurality of contact members connected to conductors of said circuit to provide a power take-off therefrom, one of said members comprising a two piece, separable structure normally spring biased into mutual contact to constitute an electrical path in said cooking element circuit, an energy-consuming electrical appliance, and means including a plug connection having terminal blades engageable with said receptacle contact members for connecting said appliance to said circuit, one of said terminal blades engaging an element of said two piece structure to urge it away from its companion element to open the circuit to said heating element.

References Cited in the file of this patent

UNITED STATES PATENTS

| Number | Name | Date |
|---|---|---|
| 2,215,929 | Husk | Sept. 24, 1940 |
| 2,471,259 | Chapman | May 24, 1949 |
| 2,519,051 | Kirk | Aug. 15, 1950 |
| 2,530,643 | Berg et al. | Nov. 21, 1950 |

FOREIGN PATENTS

| Number | Country | Date |
|---|---|---|
| 458,951 | Canada | Aug. 16, 1949 |